(12) United States Patent
Sala et al.

(10) Patent No.: US 10,254,148 B2
(45) Date of Patent: Apr. 9, 2019

(54) LIQUID LEVEL SENSOR AND METHOD

(71) Applicant: GM GLOBAL TECHNOLOGY OPERATIONS LLC, Detroit, MI (US)

(72) Inventors: Dorel M. Sala, Troy, MI (US); Richard J. Skurkis, Lake Orion, MI (US); Nancy L. Johnson, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 68 days.

(21) Appl. No.: 15/624,976

(22) Filed: Jun. 16, 2017

(65) Prior Publication Data
US 2018/0364090 A1 Dec. 20, 2018

(51) Int. Cl.
*G01F 23/20* (2006.01)
*G01F 23/00* (2006.01)
*G07C 5/08* (2006.01)
*B60K 35/00* (2006.01)
*G01F 23/296* (2006.01)

(52) U.S. Cl.
CPC .......... *G01F 23/2967* (2013.01); *B60K 35/00* (2013.01); *G01F 23/0069* (2013.01); *G07C 5/0825* (2013.01); *B60K 2350/1096* (2013.01)

(58) Field of Classification Search
CPC ............. G01F 23/2967; G01F 23/0069; G07C 5/0825; B60K 35/00; B60K 2350/1096
See application file for complete search history.

(56) References Cited

U.S. PATENT DOCUMENTS

| 4,107,994 A | 8/1978 | Sogo |
| 4,193,010 A | 3/1980 | Kompanek |
| 4,656,384 A | 4/1987 | Magori |
| 5,138,880 A | 8/1992 | Lee et al. |
| 5,613,399 A * | 3/1997 | Hannan ................. G01F 23/265 |
| | | 702/55 |
| 5,697,248 A | 12/1997 | Brown |

(Continued)

FOREIGN PATENT DOCUMENTS

| GB | 2302946 A | 2/1997 |
| WO | 9957527 A1 | 11/1999 |

OTHER PUBLICATIONS

Swedish Patent Office, International Search Report issued in International Application No. PCT/NO99/00145, dated Sep. 29, 1999.

(Continued)

*Primary Examiner* — Tyler J Lee
(74) *Attorney, Agent, or Firm* — Lorenz & Kopf LLP

(57) ABSTRACT

A liquid level sensor is arranged to sense a quantity of a liquid within a reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal.

18 Claims, 3 Drawing Sheets

(56) References Cited

U.S. PATENT DOCUMENTS

| | | | | |
|---|---|---|---|---|
| 5,747,689 | A * | 5/1998 | Hampo | G01F 23/265 702/55 |
| 5,793,705 | A | 8/1998 | Gazis et al. | |
| 6,138,508 | A * | 10/2000 | Hannan | G01F 23/265 324/665 |
| 6,782,736 | B1 * | 8/2004 | Hammer | G01F 23/26 73/304 C |
| 2006/0042375 | A1 * | 3/2006 | Davis | G01F 23/247 73/295 |
| 2008/0184795 | A1 * | 8/2008 | Woodard | G01R 33/1223 73/304 C |
| 2009/0187357 | A1 * | 7/2009 | Ho | G01F 23/266 702/52 |
| 2009/0320587 | A1 * | 12/2009 | Schoenmakers | G01F 23/265 73/304 C |
| 2011/0314907 | A1 * | 12/2011 | Wiedekind-Klein | G01F 23/268 73/304 C |
| 2012/0323503 | A1 * | 12/2012 | Welle | G01F 23/26 702/55 |
| 2013/0220013 | A1 * | 8/2013 | Fitz | G01F 23/26 73/304 R |
| 2014/0096602 | A1 | 4/2014 | Ohmayer | |

OTHER PUBLICATIONS

Enn Engineers Private Limited, "Level Measurement." Retrieved on Aug. 7, 2016. Retrieved from Internet: <URL:http://www.indiamart.com/ennengineers-gurgaon/level-measurement.html>.

* cited by examiner

LIQUID LEVEL SENSOR AND METHOD

TECHNICAL FIELD

This patent generally relates to liquid level sensors, and more particularly, this patent relates to a discrete liquid level sensor and a method of sensing a level of a quantity of liquid within a reservoir of a vehicle.

BACKGROUND

Motor vehicles have any number of reservoirs to contain operating liquids. Vehicles powered by internal combustion engines may have reservoirs for engine oil, coolant, brake fluid, power steering fluid, washer fluid, fuel and like. Electric and hybrid-electric powered vehicles may at least include coolant for the energy storage units, washer fluid and brake fluid among others.

Maintaining proper fluid levels can be essential to reliable operation of the vehicle. A lack of engine oil or coolant may compromise the power unit, a lack of brake fluid may compromise stopping ability, and a lack of other fluids may affect operating characteristics of the vehicle.

Accordingly, it is desirable to provide a liquid level sensor that is capable of reporting a reliable quantity of a liquid within a reservoir, and to communicate data indicating the current liquid level to one or more vehicle controls, instruments and/or displays. Furthermore, other desirable features and characteristics of the present disclosure will become apparent from the subsequent detailed description and the appended claims, taken in conjunction with the accompanying drawings and the foregoing technical field and background.

SUMMARY

In accordance with the herein described embodiments, a liquid level sensor is arranged to sense a quantity of a liquid within a reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal.

In accordance with another of the herein described embodiments, a liquid level sensor is arranged to sense a quantity of a liquid within a reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal. Wherein the second value has a maximum value and the first value has a value less than the maximum value.

In accordance with another of the herein described embodiments, a liquid level sensor is arranged to sense a quantity of a liquid within a reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal. Each sensing unit may be a piezoelectric device.

In accordance with another of the herein described embodiments, a liquid level sensor is arranged to sense a quantity of a liquid within a reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal. The excitation signal may be arranged to excite the piezoelectric device of each sensing unit to a resonant frequency.

In accordance with another of the herein described embodiments, a liquid level sensor is arranged to sense a quantity of a liquid within a reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal. The output of each sensing unit may be coupled to a processing circuit, the processing circuit may be configured to provide an output indicative of the quantity of liquid in the reservoir.

In accordance with another of the herein described embodiments, a liquid level sensor is arranged to sense a quantity of a liquid within a reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal. The sensing units may be arranged within the reservoir to indicate a height of liquid within the reservoir.

In accordance with another of the herein described embodiments, a liquid level sensor is arranged to sense a quantity of a liquid within a reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid.

A signal generator is operably electrically coupled to each of the plurality of sensing units. The signal generator is operable to provide an excitation signal to each of the plurality of sensing units. Each of the plurality of sensing units is operable to provide the output responsive to the excitation signal. The output of each sensing unit may be coupled to a multiplexer, the multiplexer may be configured to couple the outputs to a processing circuit.

In accordance with another of the herein described embodiments, a liquid level sensor is arranged to sense a quantity of a liquid within a reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal. The signal generator is operably, electrically coupled to a multiplexer, an output of the multiplexer being coupled to each of the plurality of sensing devices such that the plurality of sensing devices are sequentially provided the excitation signal.

In accordance with another of the herein described embodiments, a liquid level sensor is arranged to sense a quantity of a liquid within a reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal. The signal generator is operable to provide a plurality of excitation signals and wherein the multiplexer is operable to operably electrically couple one of the plurality of excitation signals to a corresponding one of the plurality of sensing devices.

In another non-limiting embodiment, a vehicle including a reservoir having a quantity of a liquid disposed therein is provided with a liquid level sensor arranged to sense the quantity of the liquid within the reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal.

In another non-limiting embodiment, a vehicle including a reservoir having a quantity of a liquid disposed therein is provided with a liquid level sensor arranged to sense the quantity of the liquid within the reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal. The second value has a maximum value and the first value has value less than the maximum value.

In another non-limiting embodiment, a vehicle including a reservoir having a quantity of a liquid disposed therein is provided with a liquid level sensor arranged to sense the quantity of the liquid within the reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal. Each sensing unit may be a piezoelectric device, and the excitation signal is arranged to excite the piezoelectric device of each sensing unit to a resonant frequency.

In another non-limiting embodiment, a vehicle including a reservoir having a quantity of a liquid disposed therein is provided with a liquid level sensor arranged to sense the quantity of the liquid within the reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal. The output of each sensing unit may be coupled to a processing circuit, the processing circuit having an output indicative of the quantity of the liquid in the reservoir.

In another non-limiting embodiment, a vehicle including a reservoir having a quantity of a liquid disposed therein is provided with a liquid level sensor arranged to sense the quantity of the liquid within the reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal. The processing circuit may be operably electrically coupled to provide the output indicative of the quantity of the liquid to a communication interface, the communication interface operable to communicate the quantity of liquid to a controller, instrument or display of the vehicle.

In another non-limiting embodiment, a vehicle including a reservoir having a quantity of a liquid disposed therein is provided with a liquid level sensor arranged to sense the quantity of the liquid within the reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal. The sensing units may be arranged within the reservoir to indicate a height of the liquid within the reservoir.

In another non-limiting embodiment, a vehicle including a reservoir having a quantity of a liquid disposed therein is provided with a liquid level sensor arranged to sense the quantity of the liquid within the reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal. The output of each sensing unit may be coupled to a multiplexer, the multiplexer operable to couple the outputs to a processing circuit.

In another non-limiting embodiment, a vehicle including a reservoir having a quantity of a liquid disposed therein is provided with a liquid level sensor arranged to sense the quantity of the liquid within the reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal. The signal generator being operably, electrically coupled to a multiplexer, an output of the multiplexer being coupled to each of the plurality of sensing devices such that the plurality of sensing devices are sequentially provided the excitation signal.

In another non-limiting embodiment, a vehicle including a reservoir having a quantity of a liquid disposed therein is provided with a liquid level sensor arranged to sense the quantity of the liquid within the reservoir. The sensor includes a plurality of discrete sensing units disposed within the reservoir. Each of the plurality of sensing units has an output, and the output has a first value when the sensing unit is immersed in a liquid and a second value, different from the first value, when the sensing unit is not immersed in a liquid. A signal generator is operably electrically coupled to each of the plurality of sensing units. The signal generator is operable to provide an excitation signal to each of the plurality of sensing units. Each of the plurality of sensing units is operable to provide the output responsive to the excitation signal. The signal generator is operable to provide a plurality of excitation signals and wherein the multiplexer is operable to couple operably electrically couple one of the plurality of excitation signals to a corresponding one of the plurality of sensing devices.

In another non-limiting embodiment, a method of determining a quantity of liquid in a reservoir includes providing a plurality of sensing elements arranged within the reservoir. Each of the sensing elements is excited to provide an output. The output has a first value when the sensing unit is immersed in the liquid and a second value when the sensing unit is not immersed in the liquid. The quantity of liquid within the reservoir is determined based upon the outputs of each of the sensing units.

In another non-limiting embodiment, a method of determining a quantity of liquid in a reservoir includes providing a plurality of sensing elements arranged within the reservoir. Each of the sensing elements is excited to provide an output. The output has a first value when the sensing unit is immersed in the liquid and a second value when the sensing unit is not immersed in the liquid. The quantity of liquid within the reservoir is determined based upon the outputs of each of the sensing units. Determining the quantity of liquid within the reservoir may include determining a level of the liquid within the reservoir

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
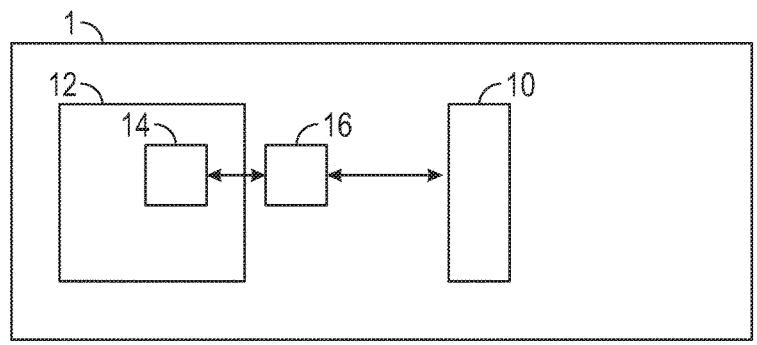
FIG. 1 is a block diagram illustration of a vehicle, including a liquid level sensor, in accordance with the herein described embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term system or module may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group), memory that executes one or more software or firmware programs, a combinational logic circuit, and/or other suitable components that provide the described functionality.

The exemplary embodiments may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment of the invention may employ various combinations of mechanical components and electrical components, e.g., integrated circuit components, memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of mechanical and/or electronic systems, and that the vehicle systems described herein are merely exemplary embodiments of the invention.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Referring to FIG. 1, a vehicle 1 is shown to include a fluid reservoir 12 within which is disposed a liquid level sensor 14. The liquid level sensor 14 is operably electrically coupled to a communication interface 16, which in turn, is operably electrically coupled to one or more controllers, instruments and/or displays within the vehicle 1. The liquid level sensor 14 is operable to sense a quantity of liquid (not depicted) within the reservoir 12 and to provide data indicative thereof. The data indicative of the quantity of liquid is provided to the communication interface 16, from which it is communicated by conventional wired or wireless techniques, such as direct wire line connection, bus communication, Internet protocol and the like, to one or more controllers, instruments or displays 10 within the vehicle 1.

Figure 2:
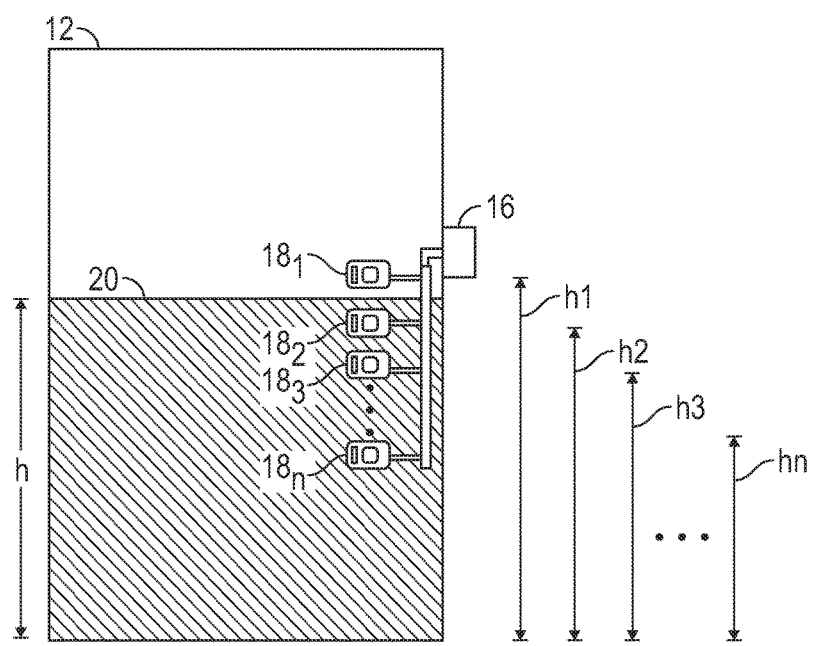
FIG. 2 is a graphic illustration of a liquid level sensor in accordance with the herein described embodiments.

As depicted in FIG. 2 and in accordance with the herein described embodiments, the liquid level sensor 14 may be a discrete sensing device having a plurality of sensing elements, shown as sensing elements 18(1-$n$). A number of the plurality of sensing elements 18(1-$n$) from no sensing elements 18(1-$n$) to all of the sensing elements 18($n$) are immersed in a quantity of liquid 20, and sensing elements 18(2-$n$) are depicted immersed in the liquid 20. Each sensing element 18 represents a height ($h_{1-n}$) or level of the quantity of liquid 20 within the reservoir 12. Knowing the cross-sectional configuration of the reservoir 12 and the level or height ($h_{1-n}$) achieved by the quantity of liquid 20 within the reservoir 12 as represented by the number of sensing elements 18 immersed within the liquid 20, it is possible to determine a quantity of the liquid 20 within the reservoir 12 as a volume. The liquid level sensor 14 and communication interface 16 may provide data indicative of the actual volume of the liquid 20 or indicative of the level or height ($h_{1-n}$) of the liquid 20 within the reservoir 12, or other suitable data either directly representing the quantity of the liquid 20 or from which the quantity of liquid 20 may be inferred.

Figure 3:
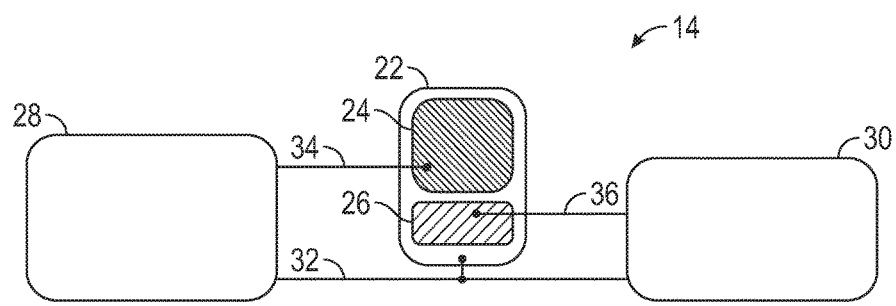
FIG. 3 is a block diagram of a liquid level sensor in accordance with the herein described embodiments.

In accordance with the herein described embodiments, and with reference to FIG. 3, each sensing element 18 may be a piezoelectric device 22 including a drive element 24 and a response element 26. A signal generator 28 is coupled to the drive element 24. The response element 26 is coupled to a processing circuit 30. The piezoelectric device 22, the signal generator 28 and the processing circuit 30 are coupled to a common potential or ground potential 32.

The signal generator 28 is operable to excite the drive element 24 to resonance vibration. In this regard, the signal generator 28 provides an excitation electrical signal 34, for example a sinusoidal signal having a frequency (f) and an amplitude (v), that will cause the drive element 24 to mechanically vibrate. The response element 26 is closely, operably coupled to the drive element 24 such that the response element 26 is operable to sense the vibratory state of the drive element 24. The excitation electrical signal 34 is configured to cause the drive element 24 to mechanically vibrate at its resonant or natural frequency. Because the drive element 24 is driven to resonant vibration, a fundamental response of the drive element 24, the signal 34 may be relatively low power.

In free air, the drive element 24 will vibrate at its resonant or natural frequency responsive to signal 34. Upon immersion in a fluid, the vibration response of the drive element 24 is damped. When the sensing element 18 is in free air, and the drive element 24 is caused to vibrate at or near its resonant frequency, an output signal of the response element 26 is at a maximum indicating the vibration of the drive element 24 to be at or near its resonant frequency. When the sensing element 18 is immersed in a fluid, the vibration of the drive element 24 is damped, and an output of the response element is lower, less than its maximum output. From the output of the response element 26, at its maximum, or less than its maximum, the processing circuit 30 is operable to determine if the sensing element 18 immersed in a liquid. From the number (0-$n$) of sensing elements 18 determined to be immersed in liquid, the height (h) (see FIG. 2) of the quantity of liquid 20 within the reservoir 12 is determined.

Figures 4A, 4B, 4C:
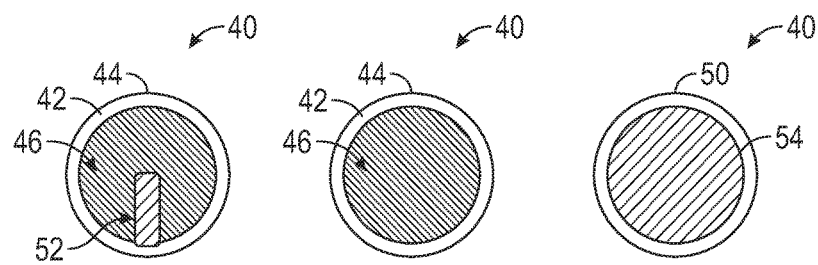
FIGS. 4a-4c are graphic illustrations of liquid level sensing element arrangements in accordance with the herein described embodiments.

Referring to FIGS. 4a-4c, a disk-shaped embodiment of a piezoelectric device 40 suitable for use within a sensing element 18 is depicted. On a first surface 42 of a substrate 44, a drive element 46 is formed by any suitable forming technique or method. The substrate 44 is circular, and the drive element 46 is also circular having a diameter slightly smaller than a diameter of the substrate 44. As depicted in FIG. 4a, response element 52 is disposed on the drive element 46, and may be adapted to be operably electrically coupled to provide a signal (not depicted) having a maximum value when a frequency of vibration of the drive element 46 is at or near resonance, and a signal having a value less than a maximum value in response to drive element 46 not vibrating at resonance as a result of being immersed in a fluid. The signal of the response element 52 is coupled to a processing circuit, such as a processing circuit 30. As depicted in FIGS. 4b and 4c, in alternative to the response element 52 being formed on the drive element 46, a response element 54 is formed on a surface 50 opposite surface 42 of the substrate 44.

Referring to FIGS. 5a-5d, a plate-shaped embodiment of a piezoelectric device 60 suitable for use within a sensing element 18 is depicted. On a surface 62 of a substrate 64, a drive element 66 is formed by any suitable forming technique or method. The substrate 64 is rectangular, but it maybe be square, triangular, oval, or any suitable shape. The drive element 66 is also rectangular of smaller dimension than those of the substrate 64.

Figures 5A, 5B, 5C, 5D:
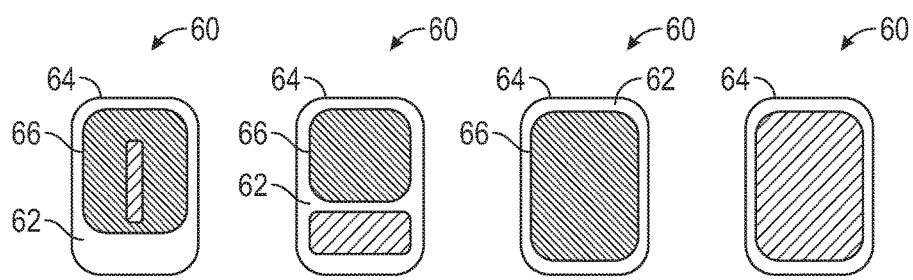
FIGS. 5a-5d are graphic illustrations of liquid level sensing element arrangements in accordance with the herein described embodiments.

FIG. 5a depicts a first exemplary embodiment of a response element 72 disposed on the drive element 66. FIG.

5b depicts a second exemplary embodiment of a response element 74 formed on the surface 62 adjacent the drive element 66. FIGS. 5c and 5d depict a third exemplary embodiment wherein the drive element 66 is larger and covers most of the surface 62, while a response element 76 is disposed on a surface 68 of the substrate 64 opposite the surface 62.

In each exemplary of the embodiments depicted in FIGS. 5a-5d, the response element 72, 74 or 76 is adapted to be operably electrically coupled to provide a signal (not depicted) having a maximum value when a frequency of vibration of the drive element 66 is at or near resonance, and a signal having a value less than a maximum value in response to drive element 66 not being at resonant vibration as a result of being immersed in a fluid. The signal of the response elements 72, 74 or 76 is coupled to a detection circuit, such as a detection circuit 30.

Depending on the type of liquid to be sensed, certain of which may be corrosive, it will be appreciated that sensing elements such as those depicted in FIGS. 4a-4c and 5a-5d will require construction from suitable materials or protected by suitable coatings or protected encasements. For example, brake fluid may be corrosive, while detergent properties of fuel, oil, transmission fluid and the like may degrade the sensing elements over time.

Figure 6:
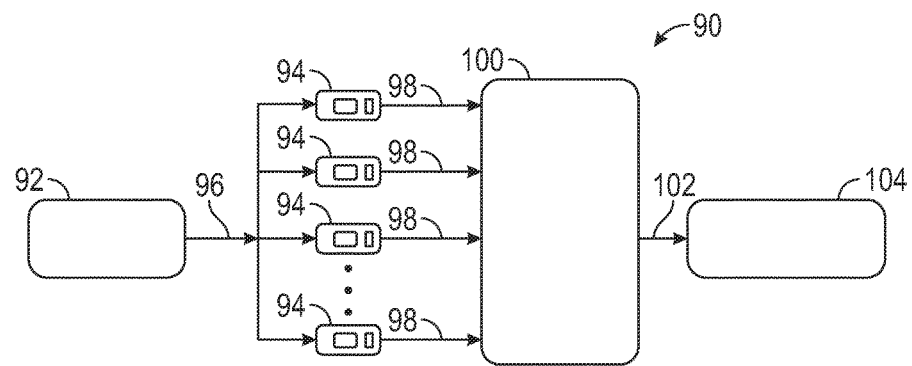
FIG. 6 is a functional block diagram of a liquid level sensor in accordance with the herein described embodiments.

Turning now to FIG. 6, there is depicted a first exemplary embodiment of a liquid level sensor 90. The liquid level sensor 90 includes a signal generator module 92 that is operably electrically coupled to a plurality of sensing elements 94 to provide an excitation signal 96. Each of the sensing elements 94 has an output signal 98, e.g., an output of a response element associated with each sensing element 94, that is operably electrically coupled to a processing circuit 100. The output signals 98 have a maximum value (voltage, frequency, amperage, or the like) when a drive element associated with a sensing element 94 is immersed in a liquid. The output signals 98 have an output value less than the maximum value when the drive element of the corresponding sensing element 94 is immersed in a fluid.

The processing circuit 100, therefore, is operable to determine which of the sensing elements 94 are reporting a maximum output value and which of the sensing elements 94 are reporting an output less value than a maximum output value. From this data, and being configured to know a physical configuration of the sensing elements 94 within the liquid level sensor 90, the processing circuit 100 has an output 102 indicative of a quantity of liquid within a reservoir within which the liquid level sensor 90 is disposed. The output 102 may be a value representing a level or height (h) of the liquid within the reservoir. Alternatively, the output 102 may be a value representing a volume of fluid within the reservoir. The output 102 is coupled to a communication interface 104, from which it may be communicated by conventional wired or wireless techniques to one or more controllers, instruments or displays within a vehicle.

Figure 7:
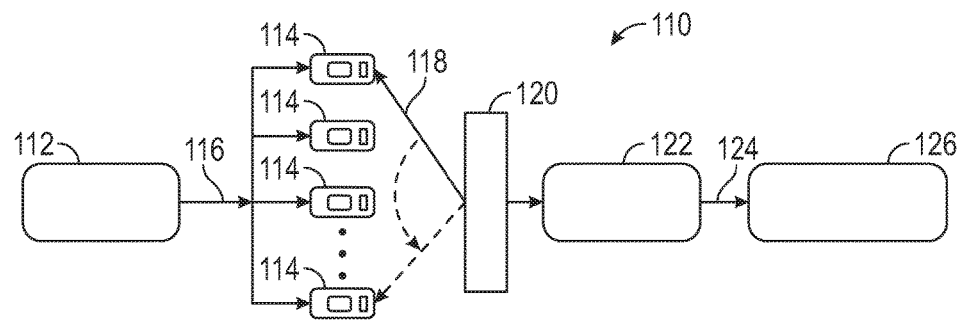
FIG. 7 is a functional block diagram of a liquid level sensor in accordance with the herein described embodiments.

FIG. 7 depicts a second exemplary embodiment of a liquid level sensor 110. The liquid level sensor 110 includes a signal generator module 112 that is operably electrically coupled to a plurality of sensing elements 114 to provide an excitation signal 116. Each of the sensing elements 114 has an output signal 118, e.g., an output of a response element associated with each sensing element 114, that is operably electrically coupled to a multiplexing circuit 120 having an output operably electrically coupled to a processing circuit 122. The output signals 118 have a maximum value (voltage, frequency, amperage, or the like) when a drive element associated with a sensing element 114 is immersed in a liquid. The output signals 118 have an on output less than the maximum value when the drive element of the corresponding sensing element 114 is immersed in a fluid.

The multiplexing circuit 120 polls the individual sensing units 114 according to a predefined duty cycle, and provides the output signals 118 to the processing circuit 122, accordingly. The processing circuit 122 is operable to determine which of the sensing elements 114 are reporting a maximum output value and which of the sensing elements 114 are reporting an output value less than a maximum output value. From this data, and being configured to know a physical configuration of the sensing elements 114 within the liquid level sensor 110, the processing circuit 122 has an output 124 indicative of a quantity of liquid within a reservoir within which the liquid level sensor 110 is disposed. The output 124 may be a value representing a level or height (h) of the liquid within the reservoir. Alternatively, the output 124 may be a value representation a volume of fluid within the reservoir. The output 124 is coupled to a communication interface 126, from which it may be communicated by conventional wired or wireless techniques to one or more controllers, instruments or displays within a vehicle.

Figure 8:
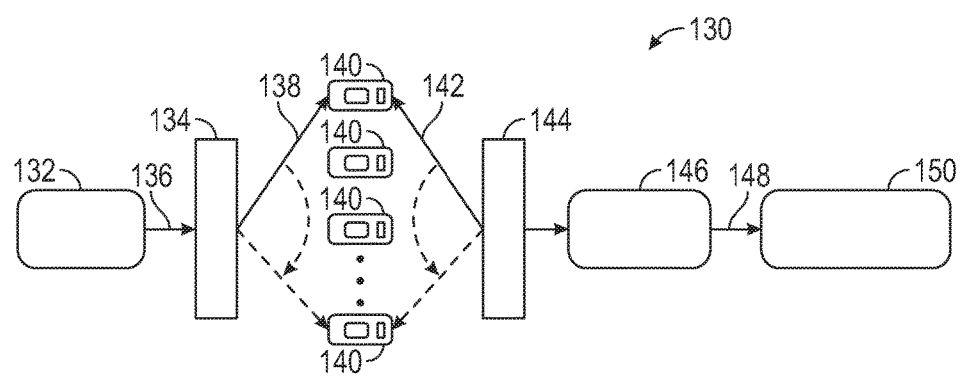
FIG. 8 is a functional block diagram of a liquid level sensor in accordance with the herein described embodiments.

FIG. 8 depicts a third exemplary embodiment of a liquid level sensor 130. The liquid level sensor 130 includes a signal generator module 132 that is operably electrically coupled to a multiplexing circuit 134. The signal generator module 132 provides one or more excitation signals 136 to the demultiplexing circuit 134, which in turn, provides excitation signals 138 to corresponding ones of a plurality of sensing elements 140. Each of the sensing elements 140 has an output signal 142, e.g., an output of a response element associated with each sensing element 140, that is operably electrically coupled to a multiplexing circuit 144 having an output operably electrically coupled to a processing circuit 146. The output signals 142 have a maximum value (voltage, frequency, amperage, or the like) when a drive element associated with a sensing element 140 is immersed in a liquid. The output signals 142 have an output value less than the maximum value when the drive element of the corresponding sensing element 140 is immersed in a fluid.

The multiplexing circuit 144 polls the individual sensing units 140 accordingly to predefined duty cycle, and provides the output signals 142 to the processing circuit 146, accordingly. The processing circuit 146 is operable to determine which of the sensing elements 140 are reporting a maximum output value and which of the sensing elements 140 are reporting an output value less than a maximum output value. From this data, and being configured to know a physical configuration of the sensing elements 140 within the liquid level sensor 130, the processing circuit 146 has an output 148 indicative of a quantity of liquid within a reservoir within which the liquid level sensor 130 is disposed. The output 148 may be a value representing a level or height (h) of the liquid within the reservoir. Alternatively, the output 148 may be a value representation a volume of fluid within the reservoir. The output 148 is coupled to a communication interface 150, from which it may be communicated by conventional wired or wireless techniques to one or more controllers, instruments or displays within a vehicle.

The liquid level sensors 90 and 110 in accordance with exemplary embodiments advantageously provide a common excitation signal simultaneously to each of the plurality of sensing elements. Each sensing element is therefore excited with each other sensor, allowing a fast reporting of the quantity of liquid within a reservoir. The liquid level sensor 130, using an excitation signal multiplexer, provides sequential excitation of the sensing elements. In such an exemplary embodiment, the sensing elements may have different resonant frequencies as the signal generator may provide different excitation signals in sequence. Also, because each sensing element is not simultaneously excited, the power requirements of the signal generator and processing circuits may be reduced.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A liquid level sensor to sense a quantity of a liquid within a reservoir, the liquid level sensor comprising:
 a plurality of discrete sensing units disposed within the reservoir, each of the plurality of discrete sensing units having a response to an excitation signal to vibrate at a resonant frequency when not immersed in the liquid and to vibrate at a second frequency when immersed in the liquid, each of the plurality of discrete sensing units having an output, the output having a first value corresponding to the second frequency when the sensing unit is immersed in the liquid and a second value corresponding to the resonant frequency, different from the first value, when the sensing unit is not immersed in the liquid;
 a signal generator operably electrically coupled to each of the plurality of discrete sensing units, the signal generator being operable to provide the excitation signal at a frequency and amplitude to cause vibration to each of the plurality of discrete sensing units such that the output of a subset of the plurality of discrete sensing units immersed in the liquid corresponds to the first value; and
 wherein each of the plurality of discrete sensing units is operable to provide the output responsive to the excitation signal such that a quantity of the liquid within the reservoir is indicated by the subset of the plurality of discrete sensing units having an output corresponding to the first value.

2. The liquid level sensor of claim 1, wherein each sensing unit comprises a piezoelectric device.

3. The liquid level sensor of claim 2, wherein the excitation signal is arranged to excite the piezoelectric device of each sensing unit to the resonant frequency.

4. The liquid level sensor of claim 1, the output of each sensing unit being coupled to a processing circuit, the processing circuit being configured to provide an output indicative of the quantity of liquid in the reservoir.

5. The sensor of claim 1, the sensing units being arranged within the reservoir to indicate a height of liquid within the reservoir.

6. The sensor of claim 1, the output of each sensing unit being coupled to a multiplexer, the multiplexer being configured to couple the outputs to a processing circuit.

7. The sensor of claim 1, the signal generator being operably, electrically coupled to a multiplexer, an output of the multiplexer being coupled to each of the plurality of sensing devices such that the plurality of sensing devices are sequentially provided the excitation signal.

8. The sensor of claim 7, the signal generator operable to provide a plurality of excitation signals and wherein the multiplexer is operable to operably electrically couple one of the plurality of excitation signals to a corresponding one of the plurality of sensing devices.

9. A vehicle comprising:
 a reservoir containing a quantity of liquid;
 a liquid level sensor to sense the quantity of liquid within the reservoir, the sensor comprising:
 a plurality of discrete sensing units disposed within the reservoir, each of the plurality of sensing units, each of the plurality of sensing units responsive to an excitation signal to vibrate at a resonant frequency when not immersed in a liquid and to vibrate at a second frequency when disposed within a liquid, each of the plurality of sensing units having an output, the output having a first value corresponding to the second frequency when the sensing unit is immersed in a liquid and a second value corresponding to the resonant frequency, different from the first value, when the sensing unit is not immersed in a liquid;
 a signal generator operably electrically coupled to each of the plurality of sensing units, the signal generator being operable to provide the excitation signal at a frequency and amplitude to cause vibration to each of the plurality of sensing units such that the output of a subset of the plurality of discrete sensing units immersed in the liquid corresponds to the first value; and
 wherein each of the plurality of sensing units is operable to provide the output responsive to the excitation signal signal such that a quantity of liquid within the reservoir is indicated by the subset of the plurality of discrete sensing units having an output corresponding to the first value.

10. The vehicle of claim 9, wherein each sensing unit comprises a piezoelectric device, and the excitation signal is arranged to excite the piezoelectric device of each sensing unit to the resonant frequency.

11. The vehicle of claim 9, the output of each sensing unit being coupled to a processing circuit, the processing circuit having an output indicative of the quantity of the liquid in the reservoir.

12. The vehicle of claim 11, the processing circuit being operably electrically coupled to provide the output indicative of the quantity of the liquid to a communication interface, the communication interface operable to communicate the quantity of liquid to a controller, instrument or display of the vehicle.

13. The vehicle of claim 9, the sensing units being arranged within the reservoir to indicate a height of the liquid within the reservoir.

14. The vehicle of claim 9, the output each sensing unit being coupled to a multiplexer, the multiplexer operable to couple the outputs to a processing circuit.

15. The vehicle of claim 9, the signal generator being operably, electrically coupled to a multiplexer, an output of the multiplexer being coupled to each of the plurality of sensing devices such that the plurality of sensing devices are sequentially provided the excitation signal.

16. The vehicle of claim 15, the signal generator operable to provide a plurality of excitation signals and wherein the multiplexer is operable to couple operably electrically couple one of the plurality of excitation signals to a corresponding one of the plurality of sensing devices.

17. A method of detecting a quantity of liquid contained within a reservoir, the method comprising:
providing a plurality of sensing units arranged within the reservoir;
exciting each sensing unit by an excitation signal at a frequency and amplitude to cause vibration of the sensing unit to provide an output corresponding to a vibratory state of the sensing unit, wherein each output has a first value corresponding to a non-resonant vibratory state of the sensing unit when the sensing unit is immersed in the liquid and a second value corresponding to a resonant vibratory state of the sensing unit when the sensing unit is not immersed in the liquid;
determining the quantity of liquid within the reservoir based upon a subset of the plurality of discrete sensing units having an output corresponding to the first value.

18. The method of claim 17, wherein determining the quantity of liquid within the reservoir comprises determining a level of the liquid within the reservoir.

* * * * *